(12) United States Patent
Vinberg et al.

(10) Patent No.: US 8,799,985 B2
(45) Date of Patent: *Aug. 5, 2014

(54) AUTOMATED SECURITY CLASSIFICATION AND PROPAGATION OF VIRTUALIZED AND PHYSICAL VIRTUAL MACHINES

(75) Inventors: Anders B. Vinberg, Kirkland, WA (US); John Neystadt, Kfar-Saba (IL); Yair Tor, Hibat Tzion (IL); Oleg Ananiev, Migdal Haemek (IL)

(73) Assignee: Microsoft Corporation, Redmond, WA (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/727,267

(22) Filed: Mar. 19, 2010

(65) Prior Publication Data
US 2011/0138442 A1    Jun. 9, 2011

Related U.S. Application Data

(63) Continuation-in-part of application No. 12/633,805, filed on Dec. 9, 2009.

(51) Int. Cl.
*H04L 29/06* (2006.01)
*G06F 21/53* (2013.01)

(52) U.S. Cl.
CPC .............. *G06F 21/53* (2013.01); *H04L 63/20* (2013.01)
USPC ........ 726/1; 726/11; 726/12; 726/13; 726/14; 726/15; 713/153; 713/154; 713/155

(58) Field of Classification Search
CPC .............................. G06F 21/53; H04L 63/20
USPC ................................................. 726/1
See application file for complete search history.

(56) References Cited

U.S. PATENT DOCUMENTS

| 6,279,111 | B1 | 8/2001 | Jensenworth et al. |
|---|---|---|---|
| 7,200,530 | B2 | 4/2007 | Brown et al. |
| 2005/0120160 | A1 | 6/2005 | Plouffe et al. |
| 2006/0224741 | A1* | 10/2006 | Jackson ................. 709/226 |
| 2007/0106986 | A1 | 5/2007 | Worley |
| 2007/0112574 | A1 | 5/2007 | Greene |
| 2007/0266433 | A1 | 11/2007 | Moore |
| 2008/0148341 | A1 | 6/2008 | Ferguson et al. |

(Continued)

OTHER PUBLICATIONS

Quynh, et al., "Centralized Security Policy Support for Virtual Machine", Retrieved at <<http://citeseerx.ist.psu.edu/viewdoc/download?doi=10.1.1.106.7370&rep=repl&type=pdf>>, Proceedings of the 20th conference on Large Installation System Administration, Dec. 3-8, 2006.

(Continued)

*Primary Examiner* — Longbit Chai
(74) *Attorney, Agent, or Firm* — Ben Tabor; Sade Fashokun; Micky Minhas

(57) ABSTRACT

Architecture that provides additional data that can be obtained and employed in security models in order to provide security to services over the service lifecycle. The architecture automatically propagates security classifications throughout the lifecycle of the service, which can include initial deployment, expansion, moving servers, monitoring, and reporting, for example, and further include classification propagation from the workload (computer), classification propagation in the model, classification propagation according to the lineage of the storage location (e.g., virtual hard drive), status propagation in the model and classification based on data stored in the machine.

20 Claims, 13 Drawing Sheets

(56) References Cited

U.S. PATENT DOCUMENTS

| | | |
|---|---|---|
| 2008/0320583 A1 | 12/2008 | Sharma et al. |
| 2009/0113517 A1 | 4/2009 | Engdahl et al. |
| 2009/0235324 A1 | 9/2009 | Griffin et al. |
| 2009/0241192 A1 | 9/2009 | Thomas |
| 2009/0249470 A1 | 10/2009 | Litvin et al. |

OTHER PUBLICATIONS

Drake, Hannah, "Virtual Machine Security Enters the Mainstream", Retrieved at <<http://searchservervirtualization.techtarget.com/news/article/0,289142,sid94_gci1350743,00.html>>, Mar. 16, 2009.

"Planning for Hyper-V Security", Retrieved at <<http://technet.microsoft.com/en-us/library/cc974516.aspx>>, Sep. 2008.

Haletky, Edward L., "VMware vSphere and Virtual Infrastructure Security: Securing the Virtual Environment", Retrieved at <<http://www.informit.com/store/product.aspx?isbn=0137158009>>, Jun. 22, 2009, pp. 1.

Begoli, Edmon., "Prototype Complex Enterprise Solutions with Just Your Workstation", Retrieved at <<http://www.devx.com/vmspecialreport/Article/30382/1954>>, Jan. 30, 2006, pp. 6.

Garfinkel, et al., "When Virtual is Harder than Real: Security Challenges in Virtual Machine Based Computing Environments", Retrieved at <<http://www.stanford.edu/~talg/papers/HOTOS05/virtual-harder-hotos05.pdf>>, 2005, pp. 6.

Cowper, Bruce., "Virtualization Security", Retrieved at <<http://www.infosecuritycanada.com/images/100358/2008_PDFs/Cowper_Virtualization_Security.pdf>>, 2008, pp. 34.

"Security within a Virtualized Environment: A New Layer in Layered Security", Retrieved at <<http://www.vmware.com/files/pdf/partners/security/security-virtualized-whitepaper.pdf>>Oct. 6, 2009, pp. 13.

"Securing the Cloud: A Review of Cloud Computing, Security Implications and Best Practices", Retrieved at <<http://www.savvis.neUen-US/Info_Center/Documents/Savvis_VMW_whitepaper_0809.pdf>>, Oct. 6, 2009, pp. 12.

"Final Office Action", Mailed Date: Nov. 15, 2012, U.S. Appl. No. 12/633,805, filed Dec. 9, 2009, pp. 11.

"Non Final Office Action", Mailed Date: Jul. 10, 2012, U.S. Appl. No. 12/633,805, filed Dec. 9, 2009, pp. 10.

* cited by examiner

AUTOMATED SECURITY CLASSIFICATION AND PROPAGATION OF VIRTUALIZED AND PHYSICAL VIRTUAL MACHINES

CROSS-REFERENCE TO RELATED APPLICATIONS

This application is a Continuation-in-Part of pending U.S. patent application Ser. No. 12/633,805 entitled "MODEL BASED SYSTEMS MANAGEMENT IN VIRTUALIZED AND NON-VIRTUALIZED ENVIRONMENTS" filed on Dec. 9, 2009, the entirety of which is incorporated by reference.

BACKGROUND

The deployment of virtual machines and the securing thereof are separate and unrelated tasks that negatively impact resources and are prone to mistakes or inconsistencies due to the manual nature of coordinating between management and security. Some existing deployments implement a protection policy based on a manifest supplied by the applications. Other deployments monitor servers based on a model that specifies relations and resource requirements. These potential disconnects between security and administration can create errors that further cause security risks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides additional data that can be obtained and employed in security models in order to provide security to services over the service lifecycle. A service is provided by one or more computers (e.g., virtual machines, physical machines). The computers are given classifications that drive security policy enforcement. The lifecycle security requirements utilized are employed in model-based systems management in virtualized environments as well as non-virtualized environments. Computers can be added or removed from the service in response to dynamic changes in scale and capacity.

The architecture automatically propagates security classifications throughout the lifecycle of the service, which can include initial deployment, expansion, moving servers, monitoring, and reporting, for example. The propagations can include the additional data that comprises classification propagation from the workload (computer), classification propagation in the model, classification propagation according to the lineage of the storage location (e.g., virtual hard drive), status propagation in the model, and classification based on information stored in a machine.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
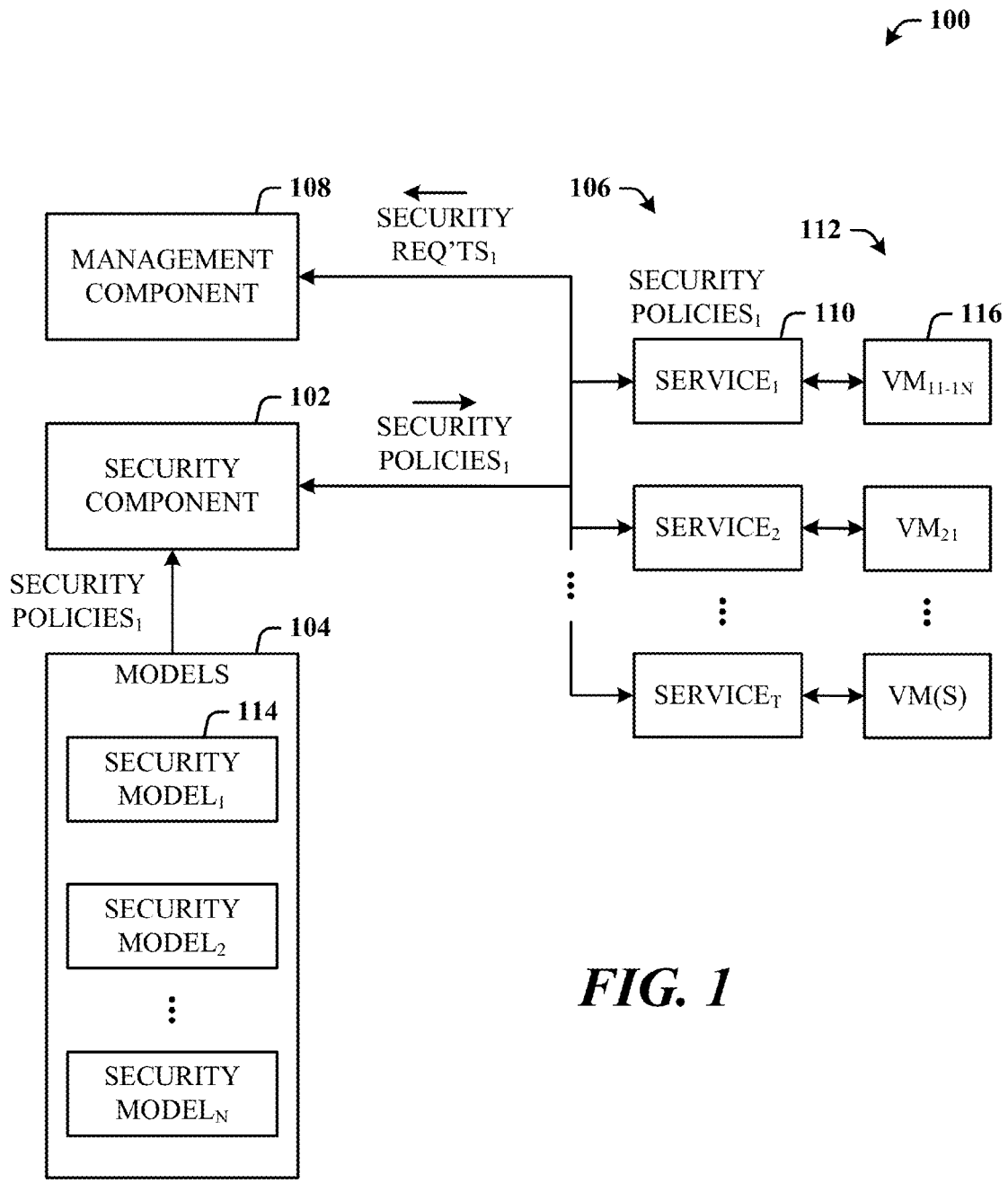
FIG. 1 illustrates a computer-implemented systems management system in accordance with the disclosed architecture.

The disclosed architecture describes additional data that can be obtained and employed in security models in order to provide security to services over the service lifecycle. The propagations can include the additional data, that comprises classification propagation from the workload (computer), classification propagation in the model, classification propagation according to the lineage of the storage location (e.g., virtual hard drive), and status propagation in the model.

The additional data can be employed separately or in various combinations with the other parameters for securing the system, such as virtual machine to physical machine mapping, host hardening/lockdown configuration, and firewall/IDS (intrusion detection system)/IPS (intrusion prevention system) configuration. The mapping (referred to as a virtualization management) is according to manual or automatic classification of workloads. For example, an SQL (structured query language) server and web server are classified differently, and thus, not placed on the same physical host. The host hardening/lockdown configuration parameters can apply to each virtual machine. The firewall/IDS/IPS configuration is employed to secure a newly deployed virtual machine.

A systems management system is provided that calls a security subsystem to apply security requirements during the lifecycle of services defied across one or more computers (e.g., virtual machines) and/or services as well as non-virtualized environments, from initial deployment, expansion, moving servers, to monitoring, and reporting, for example. Alternatively, or in combination therewith, the security requirements information can be fed back to the general systems management system which uses this information in its own activities. For example, the classification information, which is used to guide the placement of workloads on servers, can be security related, but the placement is a general management function. A placement algorithm that performs this placement function can employ many factors to determine placement—both the security classification described herein as well as resource requirements and available capacity, network bandwidth and latency requirements, network topology for access to a storage area network (SAN), reliability, and the designs of the administrator, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented systems management system 100 in accordance with the disclosed architecture. The system 100 comprises a security component 102 associated with security models 104 which define security requirements for one or more computers that comprise logical services 106, and a management component 108 that applies one or more of the security models 104 to the services 106 (e.g., a first service 110) over a lifecycle of the services (e.g., the first service 110).

Each of the services 106 can be associated with one or more virtual machines (VMs) 112 to which the security models 104 (and policies thereof) are applied to provide a secure virtualized environment. The services 106 can be mapped to physical machines (not shown) according to the classification of workloads. The management component 108 associates functional models to the security models 104 to assign the one or more of the security models 104 to an appropriate function of the services 106.

Consider that a first security model 114 is created with policies that define the security requirements to be applied to the first security service 110. The security component 102 accesses the security policies (Security Policies$_1$) from the first security model 114 and applies the policies to the first service 110 and associated VM(s) 116 over the lifetime of the service 110 and VM(s) 116. Alternatively, the management component 108 can submit calls to the security component 102 to apply the policies directly or obtain (or receives) the security policies from the security component 102 and apply the policies to the first service 110 and associated VM(s) 116. In any case, the services 106 and virtual machines 112 may experience security policy changes or the same security polices over the lifetime of such services 106 and virtual machines 112.

As previously indicated, in one embodiment the management component 108 can apply the one or more security models 104 to facilitate deployment of the service 110, configuration update of the service 110, start/stop of the service 110, add new virtual machine(s) to the service 110 or remove virtual machine(s) from the service 110, and relocation of the service 110 across physical hosts or networks, for example, according to a dynamically changing requirements related to scale and/or capacity. The one or more of the security models 104 include mapping of the service 110 to physical machines, host configuration lockdown for the service 110, and configuration of firewall, intrusion detection, and intrusion prevention to secure the service 110. The security requirements (Security Req'ts$_1$) related to the first service 110 and associated VM(s) 116 can also be fed back to the management component 108 for its own purposes.

Figure 2:
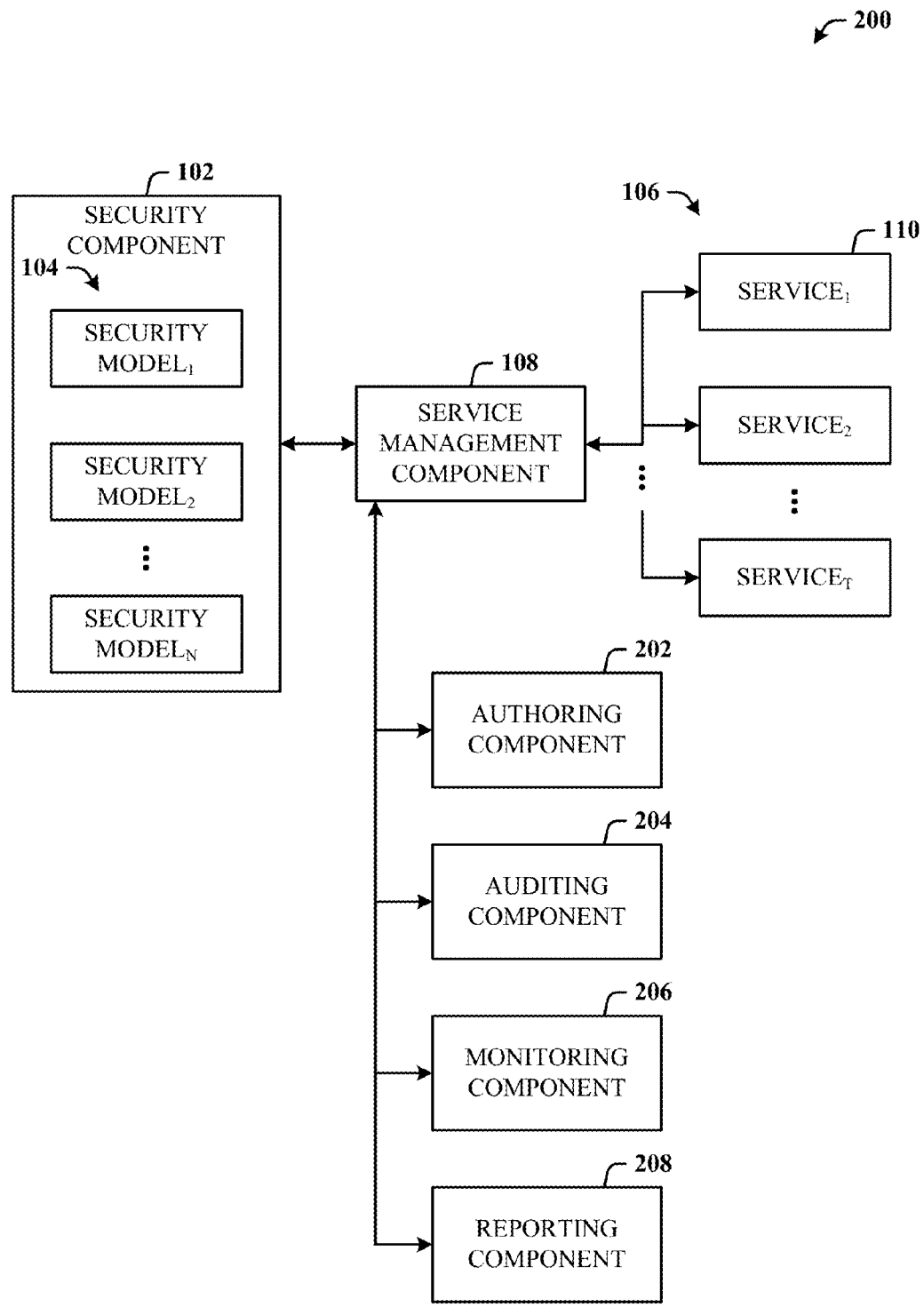
FIG. 2 illustrates an alternative embodiment of a systems management system.

FIG. 2 illustrates an alternative embodiment of a systems management system 200. The system 200 includes the entities and components of the system 100 of FIG. 1. The system 200 can further comprise an authoring component 202 for authoring the security models. The system 200 can further comprise an auditing component 204 that validates and detects discrepancies between a deployed service and the applied one or more security models. The system 200 can further comprise a monitoring component 206 for monitoring data handling and storage in compliance with imposed security practices and a reporting component 208 for generating reports related to maintaining compliance with security practices.

Put another way, a computer-implemented systems management system is provided that comprises a security component that includes security models which define security requirements for services and a management component that applies one or more of the security models to a service over a lifecycle of the service. The security models associated with functional models to assign the one or more of the models to an appropriate function of the service. The services include virtual machines to which the security models are applied, the virtual machines mapped to physical machines according to classification of workloads.

The system can further comprise at least one of an authoring component for authoring the security models, an auditing component that validates and detects discrepancies between a deployed system and the security model, or a reporting component for producing reports of compliance to the one or more of the security models applied.

The one or more of the security models include mapping of the servers the service is comprised of physical machines, networks to which virtual machines are connected, host configuration lockdown for the service and configuration of firewall, intrusion detection, and intrusion prevention subsystems to secure the service. The management component provides secure deployment of newly-added services according to a security model, and configuration of a network environment according to the security model.

Figure 3:
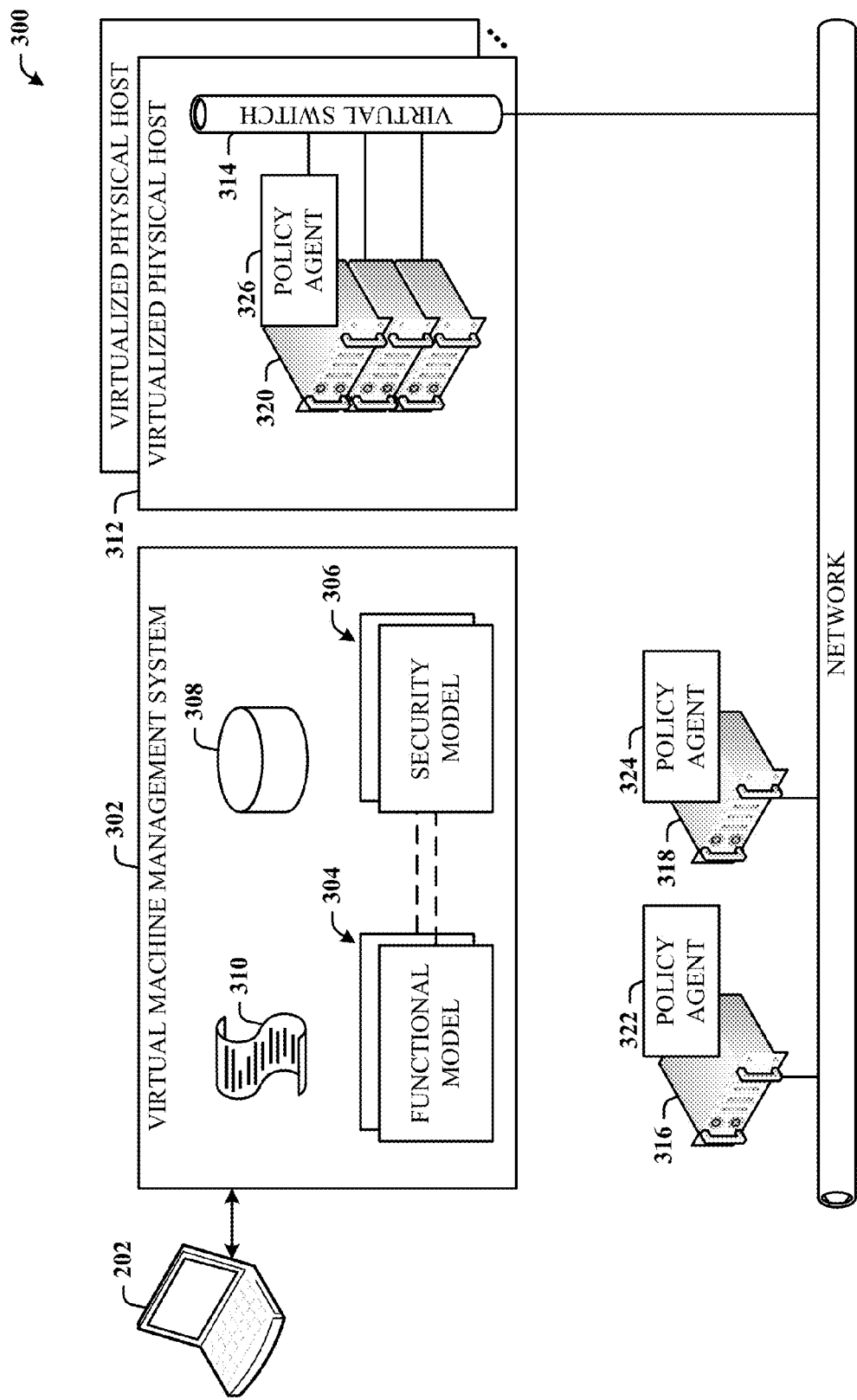
FIG. 3 illustrates a more detailed alternative embodiment of a systems management system for virtualized environments.

FIG. 3 illustrates a more detailed alternative embodiment of a systems management system 300 for virtualized environments. Modern management systems, such as a virtual machine management system 302 (management component 108), evolve towards model based management, when having formal functional models 304 that contain logical descriptions of one or more machines that comprise a service. The system 300 further introduces an extension to the management functional models 304 in the form of security models 306. The security models 306 are distinct from the functional models 304, but are associated with one another.

The contents of a security model can describe various formal aspects, such as machine classification 308, network security configuration and, host lockdown and hardening. With respect to machine classification, a classification label can be assigned to each virtual machine via a host classification system 308. Classification is used to guide the placement of workloads on servers (load management), which can be security related, but the placement is a general management function.

A placement algorithm that performs this placement function can employ many factors to determine placement such as both the security classification described herein as well as resource requirements and available capacity, network bandwidth and latency requirements, network topology for access to a storage area network, reliability, and the designs of the administrator, for example. Classification can be performed manually through an administrative action based on the software role installed in the virtual machine, or via an automatic classification system.

The virtual machine management system 302 can include logic that decides which physical host on which to place a virtual machine. This logic takes considers parameters such as CPU and I/O (input/output) load (resource). This logic also considers the virtual machine classification so that machines of different classifications are physically isolated by different virtual or physical networks, and optionally, different physical hosts. A virtual system administrator can specify a policy 310 that defines the level of isolation the administrator wants to assign to every group of virtual machines, based on classification.

With respect to network security configuration, the security models can include settings, such as (these are examples, there may be others) utilized to secure the following:

Network isolation and connectivity needs that can impact a virtualized physical host 312, and a virtual switch 314 in the host 312 to which a virtual machine is to be connected;

Where firewalls are to be deployed to isolate and secure different zones of a datacenter and to which networks the firewalls are connected. This can be done according to the host classification system 308 or role as specified in the functional service models 304;

Network firewall(s) 316—configuration elements such as which TCP/IP ports are to be allowed/denied to secure communications between the virtual machines, and application (e.g., layer-7) specific settings;

IDS/IPS configuration—IDS/IPS configuration properties specific to application roles implemented by each virtual machine;

Validation of the integrity of a file (e.g., virtual hard disk (VHD)) before launch of a virtual machine; and Encryption of the VHD file while at rest in the library or during transmission.

These functions can be included by policies attached to the security model(s). Many other functions can be provided, as desired.

With respect to host lockdown and hardening, a set of security practices exist for each application role. A security model 306 includes settings for host-specific security settings that can be automatically applied when a virtual machine is deployed, according to its role, as described in a functional service model 304.

With respect to using security models 306 in the systems management lifecycle, a number of tasks are typically performed that will use the security model to secure the system include initial deployment, expansion, moving servers, monitoring, and reporting.

With respect to initial deployment, consider that an administrator who operates the virtual machine management system 302, decided to deploy a new set of virtual machines 320. During deployment, the management system 302 invokes security policy agents (322, 324, and 326) to adjust the security of the deployed virtual machines 320 according to the security model(s) 306. The management system 302 can determine to provision additional virtual machines, such as firewall 316 or network IPS/IDS to satisfy the security model 306. The adjustment can be customized by the system-specific security policy 310.

With respect to expansion, consider that the administrator, or system, determines that there is insufficient capacity. As a result, a new virtual machine 320 can be provisioned. The disclosed architecture secures the newly added virtual machine 320 according to the security model(s) 306, and can reconfigure the network environment (network firewall(s) 316 and network IDS/IPS 318) according to the security model(s) 306.

Virtual machines can be moved to a different host (e.g., for load balancing or fault tolerance). When a virtual machine 320 is moved from one physical host (e.g., virtualized physical host 312) to another physical host, the security model(s) 306 can be used to choose a physical host and which virtual network to connect to the physical host via the virtual switch 314. If an IP address of the virtual machine 320 changes, the network environment (network firewall(s) 316 and network IDS/IPS 318) are adjusted accordingly.

With respect to monitoring and auditing configuration, the administrator can perform an audit of the actual system to detect deviations from the model/security policy according to constraints specified in the security model(s) 306, and either correct automatically or manually the configuration to be conformant, or approve an exception. For example, if a virtual machine is connected to a wrong virtual switch, or has Internet connectivity bypassing a firewall, this is detected, according to the security model(s) 306.

All the configuration operations and exception approvals can be audited. The administrator can produce reports of compliance of the system to the model, including a list of violations and approved exceptions from the model.

Additionally, the authoring component 202 enables the creation of the security model(s) 306. A model may be authored by developers of the service or by IT administrator, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
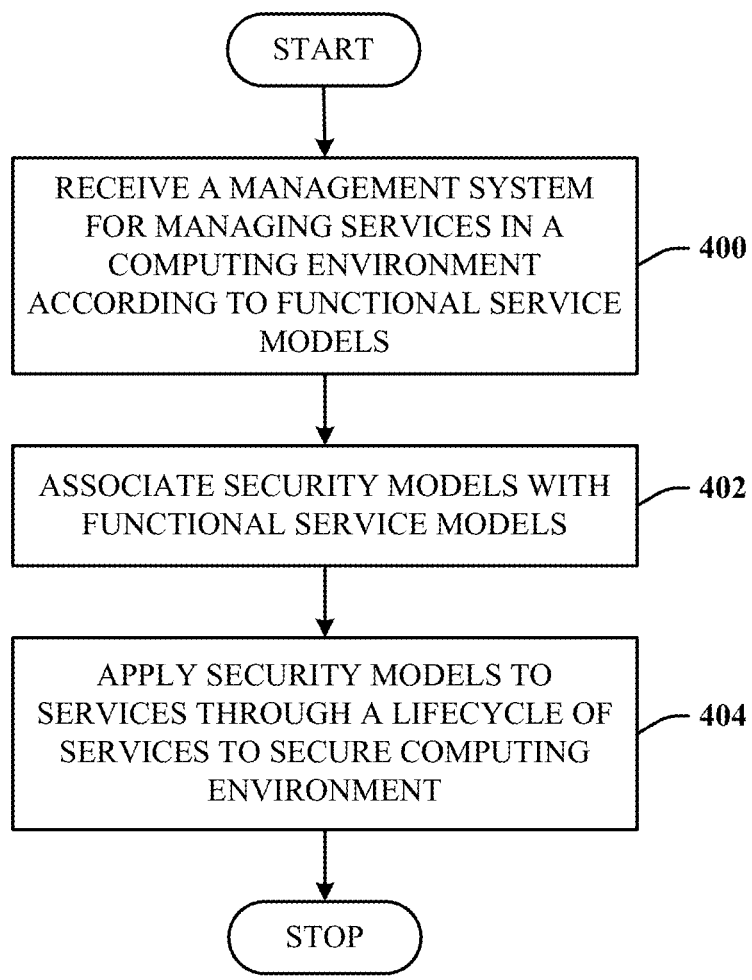
FIG. 4 illustrates a computer-implemented systems management method in accordance with the disclosed architecture.

FIG. 4 illustrates a computer-implemented systems management method in accordance with the disclosed architecture. At 400, a management system is received for managing services in a computing environment (virtual or non-virtual) according to functional service models. At 402, security models are associated with the functional service models. At 404, one or more security models are applied to the services through a lifecycle of the services to secure the computing environment.

Figure 5:
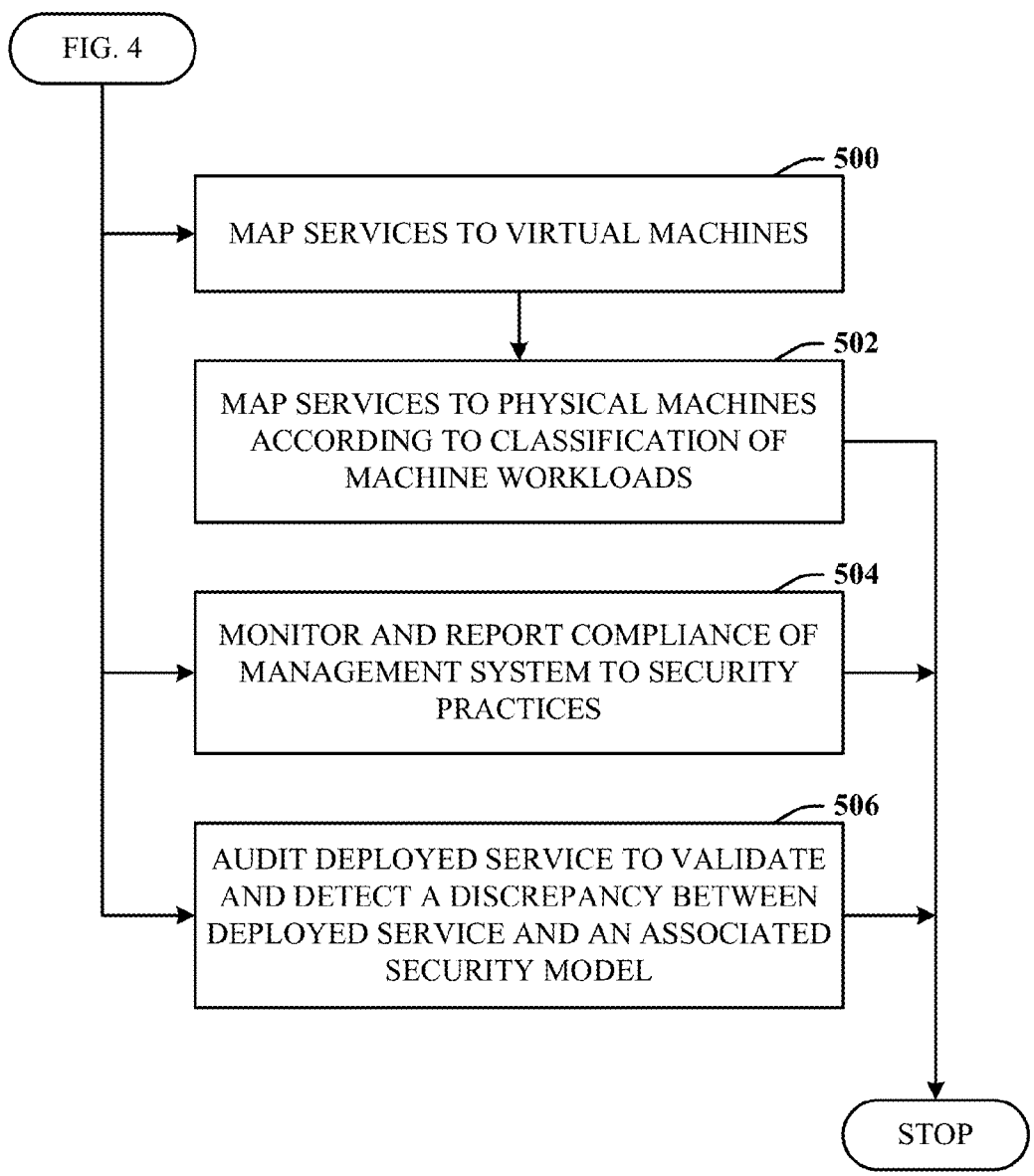
FIG. 5 illustrates additional aspects of the method of FIG. 4.

FIG. 5 illustrates additional aspects of the method of FIG. 4. At 500, services are mapped to virtual machines. In other words, a service can be mapped to a single virtual machine or to multiple virtual machines. At 502, the virtual machines are mapped to physical machines according to classification of machine workloads. At 504, compliance of the management system to security practices is monitored and reported. At 506, a deployed service is audited to validate and detect a discrepancy between the deployed service and an associated security model.

Figure 6:
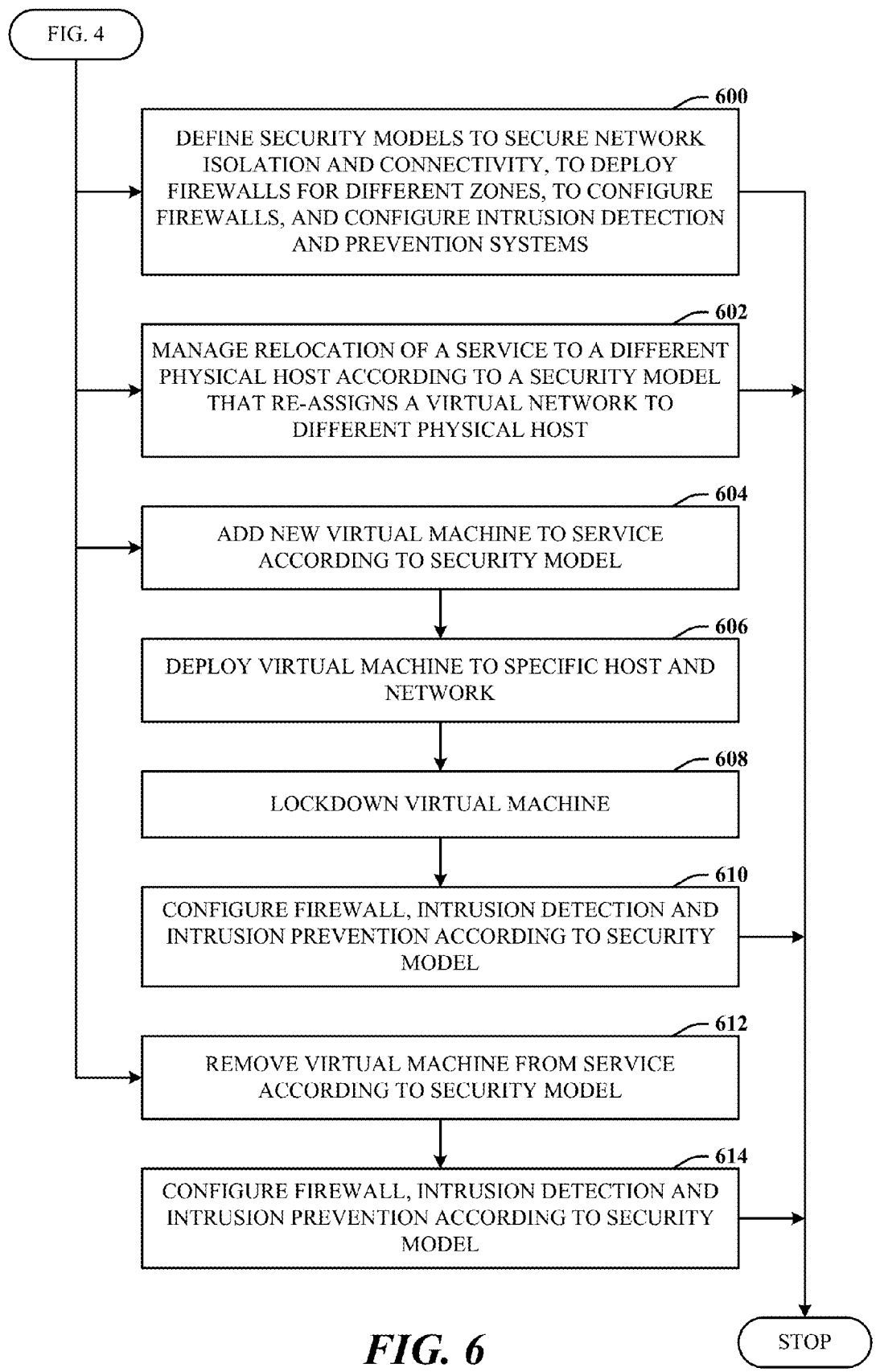
FIG. 6 illustrates additional aspects of the method of FIG. 4.

FIG. 6 illustrates additional aspects of the method of FIG. 4. At 600, the security models are defined to secure network isolation and connectivity, to deploy firewalls for different zones, to configure the firewalls, and configure intrusion detection and prevention systems. At 602, relocation of a service to a different physical host is managed according to a security model that re-assigns a virtual network to the different physical host. At 604, a new virtual machine is added to a service according to a security model. At 606, the virtual machine is deployed to a specific host and network. At 608, the virtual machine is locked down. At 610, firewall, intrusion detection, and intrusion prevention are configured according to the security model. At 612, a virtual machine is removed from a service according to a security model. At 614, firewall, intrusion detection, and intrusion prevention are configured according to the security model.

Following is a description where additional information related to workload and model characteristics can be employed separately or in combination with the security requirements defined in the security models.

In order to apply security policies, machines (virtual and physical) can be classified. Classification can be performed by assigning a set of claims, each of which includes a name and a value for a particular machine. Examples of claims include the following: machine role—desktop, database, web server (role=desktop); organization affinity—sales department, finance department (ou=sales); sensitivity—high-business-impact (hbi), medium-business-impact (mbi), low-business-impact (lbi) (sensitivity=hbi); and, phase—setup, staging, production (phase=production).

Classification can be done manually or automatically. Once machines have been classified, the classification can be used for a plurality of policy enforcements, including, but not limited to: to which network VLAN the machine should be connected, what firewall policy should be applied, what IPSec rules should apply, what level of auditing should be applied to the activity related to this machine, etc.

Claims can be issued by different sources such as a virtual machine management system, human administrators, end-users, owners of the information within the machine, and automated information classification systems. The source of the classification (claim) can be recorded and propagated with the classification, to be related in the policy—as some of the claims can be considered more reliable than others.

Requiring such classification is a burden on the IT administrators, and it may be difficult because administrators may not have the information. To reduce cost of manual classification, the following propagations can be performed. The propagations can include the additional data that comprises classification propagation from the workload (computer), classification propagation in the model, classification propagation according to the lineage of the storage location (e.g., virtual hard drive), status propagation in the model, and classification based on information stored in a virtual machine.

Figure 7:
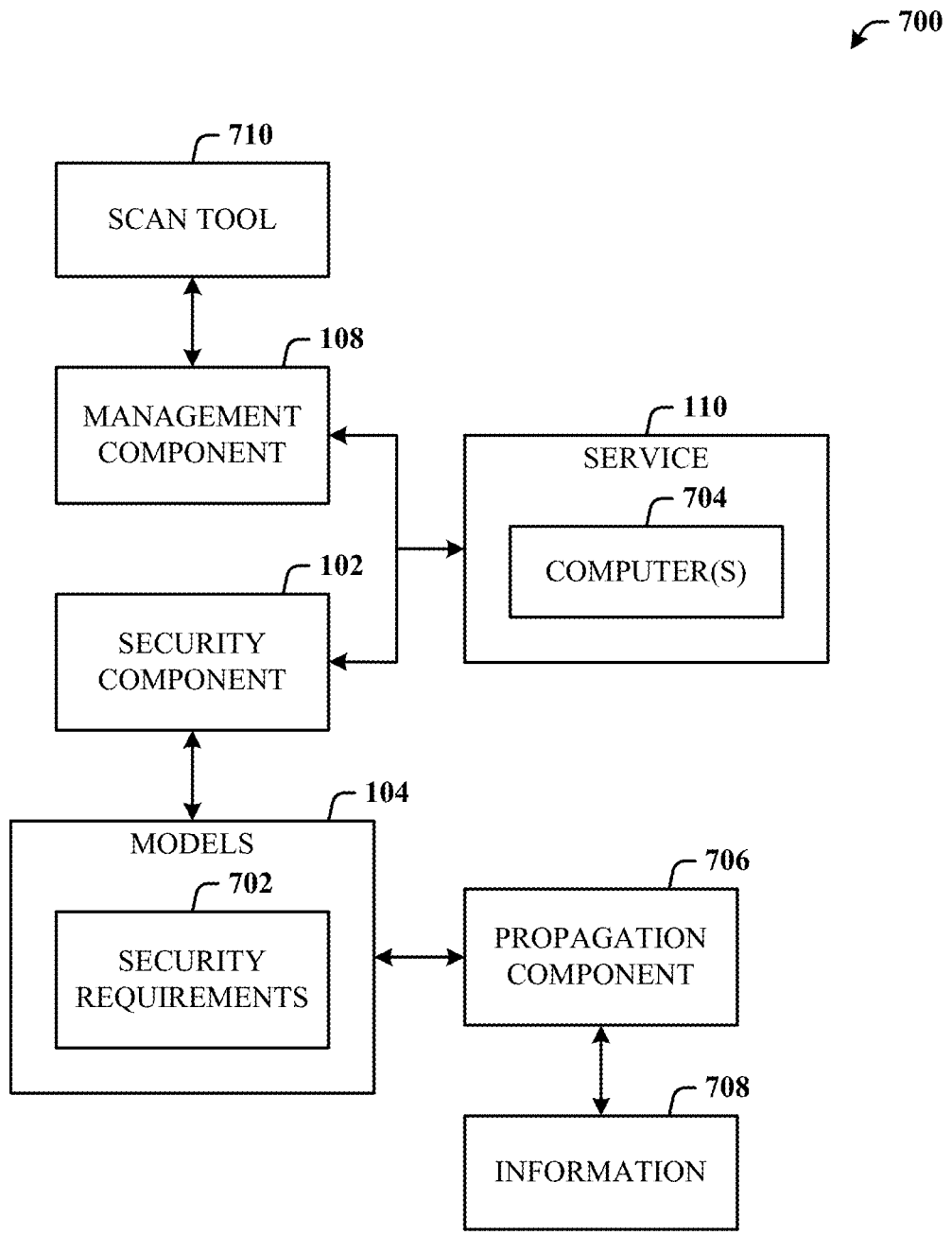
FIG. 7 illustrates an alternative embodiment of a computer-implemented systems management system.

FIG. 7 illustrates an alternative embodiment of a computer-implemented systems management system 700. The system 700 includes the management component 108 that applies the one or more security models 104 to the service 110 over the service lifecycle. The one or more security models 104 define security requirements 702 for one or more computers 704 that comprise the service 110. In other words, the service 110 can be handled by one computer or be provided by multiple computers. The system 700 can also include a propagation component 706 that obtains and forwards information 708 associated with model characteristics and workload to the management component for utilization in applying the one or more security models 104 for security of the one or more computers 704 during the service lifecycle.

The propagation component 706 obtains workload classification information of previously-tagged classification data of a workload for inclusion in the security requirements 702 applied to the one or more computers. The system 700 can further comprise a scanning tool 710 that scans a storage location of the workload for the previously-tagged classification data. The storage location can be a virtual hard disk of a computer that is a virtual machine.

The propagation component 706 obtains the information 708, which includes detailed model characteristics and workload of a security model that are applied with the security requirements for the one or more computers, lineage information associated with a storage location that is applied with the security requirements for the one or more computers, status information that is propagated in the security requirements for the one or more computers of the service, and/or status information (e.g., compromise information that defines if the one or more computers have been compromised). The compromise information is propagated in the security requirements for the one or more computers of the service that have not been compromised.

Figure 8:
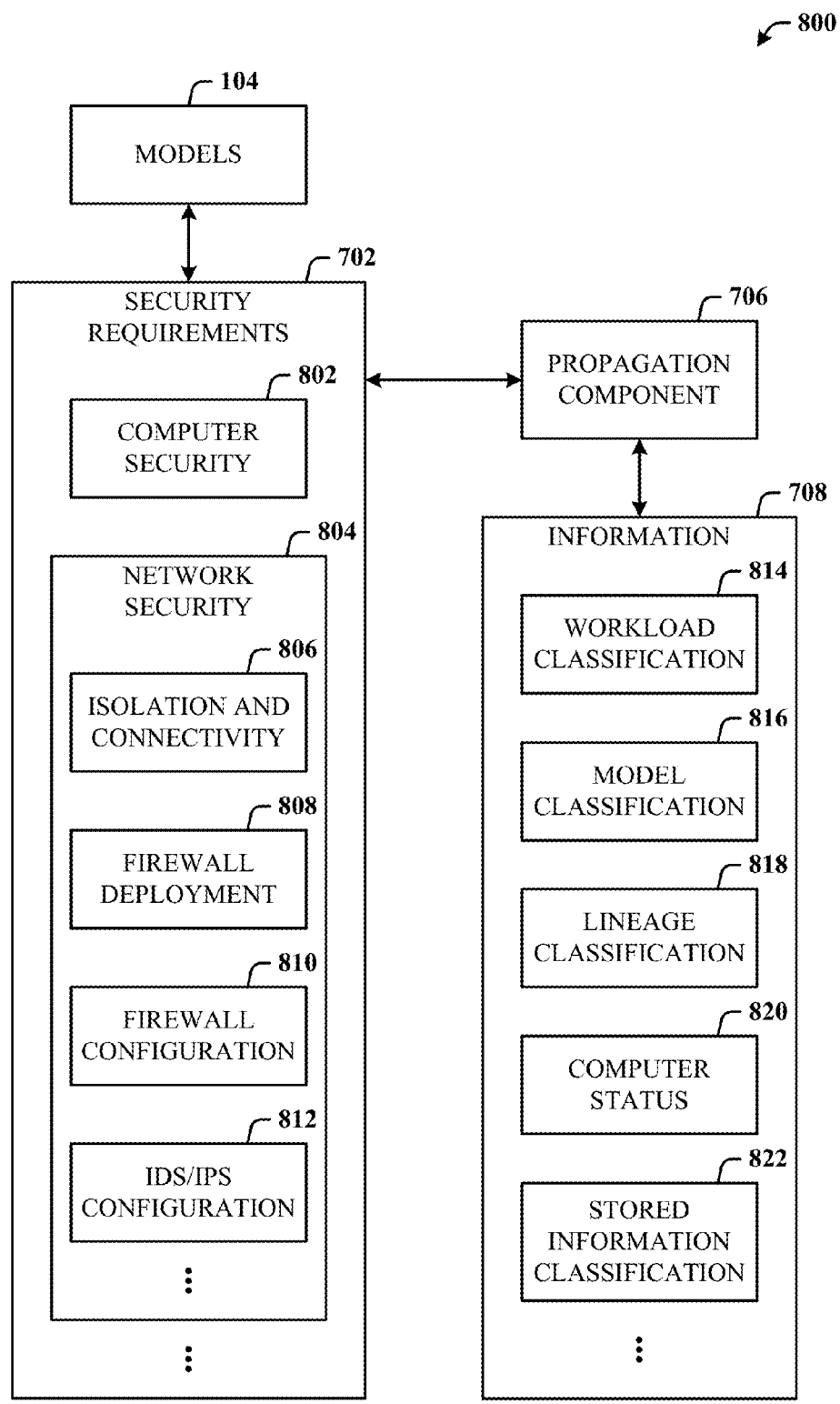
FIG. 8 illustrates more details related to the additional information obtained and utilized in or with the security requirements.

FIG. 8 illustrates a system 800 having more details related to the additional information 708 obtained and utilized in or with the security requirements 702. As previously described, the security requirements 702 of the models 104 can include requirements related to computer security 802, network security 804, and other security requirements. The computer security 802 can include the machine classification data based on machine role, CPU, I/O load, resource load, etc. The network security 804 includes the requirements related to isolation and connectivity 806, firewall deployment 808, firewall configuration 810, IDS/IPS configuration 812, and other requirements, as desired.

The information 708 includes workload classification 814, model classification 816, lineage classification 818, computer status 820, and classification based on information stored in a virtual machine 822, for example. With respect to workload classification 814 (classification propagation from the workload), workloads (e.g., virtual machines, and hence, the VHDs in which the virtual machines are stored) can be given classification which drives security policy enforcement. However, utilization of such classification can be a burden on administrators, and it may be difficult because the administrators may not have the information. In many cases, the data has already been classified through other means, which indicates that the VHD (the VM image) contains data that already has been tagged with classification. The scanning tool 710 scans the VHD, finds such classification, and automatically applies the correct classification to the workload (the VM) in the security model.

With respect to model classification 816 (classification propagation in the model), in many cases, one particular (e.g., VM) has been classified (explicitly or through propagation from the contents as above). This classification can propagate automatically in the model. For example, if a database has been classified as personally identifiable information (PII), then the other servers in the service that use that database can be classified as well. More rigorous rules for how such propagation work can be created. For example, if an application server is classified as PII, and the server uses a product inventory database server to lookup data, but does not write to that server, then the PII classification does not propagate to the inventory server. Thus, the propagation rules can depend on the detailed characteristics of the model.

With respect to lineage classification 818 (classification propagation according to the lineage of the storage location, e.g., VHD), security the model tracks the version lineage of the VHDs, and identifies that the associated workload (computer) is a descendant of another. If a classification is applied to a parent computer (e.g., VM), the classification is automatically propagate to its descendants.

The creation of a later version does not mean that the older version is no longer used. The descendant is not always a later version, but may be a variant for purposes of tuning or adaption to different requirements. The propagation may be automatically adapted based on metadata in the lineage relationship or may be manually overridden.

With respect to computer status 820 (status propagation in the security model), if a security monitoring system has determined (e.g., through intrusion detection, anti-malware detection, or other means) that a server has been compromised, this compromised status can be propagated to the other servers in the service, even if such compromise has not yet been detected on those servers. For example, if an application server has been compromised, it can be assumed that the database that the server uses has also been compromised. It can be difficult to detect such a compromise in the database, since the database simply serves data back as requested. However, if the application server is compromised, this data can be considered to be leaked. Moreover, if the application server writes to the database, the data of the database can be deemed to be suspect. Hence, a PII classification on a database, combined with intrusion detection on another server can generate a strong alarm if those two servers cooperate, even when no intrusion was detected on the database server.

With respect to classification propagation according to data in a machine 822, if the machine (e.g., virtual) includes data that was classified by a classification engine (e.g. high-business-impact, low-business-impact), machine classification can be automatically derived from that data.

Put another way, the propagation component obtains classification information of an entity (e.g., computer, virtual machine, physical storage location, virtual storage location, etc.) of a model and propagates the classification information to another entity (e.g., computer, virtual machine, physical storage location, virtual storage location, etc.) of the model as part of the security requirements 702. The propagation component obtains lineage information associated with a computer (e.g., storage location of the computer) of the service and propagates classification information to another computer associated with the lineage information, as part of the security requirements 702. The propagation component obtains status information of a service entity (e.g., computer, virtual machine, physical storage location, virtual storage location, etc.) and propagates the status information to another entity of the service, as part of applying the security requirements 702. The status information includes compromise information that defines if the one or more computers have been compromised. The compromise information can be propagated in the security requirements 702 to other computers of the service.

Figure 9:
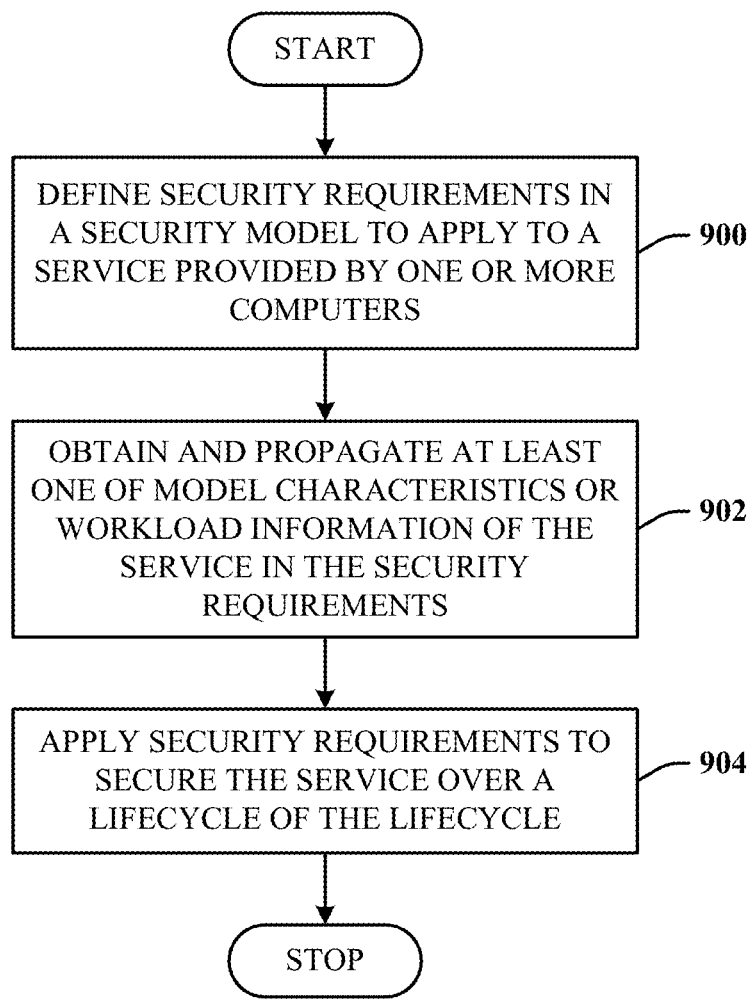
FIG. 9 illustrates a computer-implemented system management method.

FIG. 9 illustrates a computer-implemented system management method. At 900, security requirements are defined in a security model to apply to a service provided by one or more computers. At 902, at least one of model characteristics or workload information of the service are obtained and propagated in the security requirements. At 904, the security requirements are applied to secure the service over a lifecycle of the lifecycle.

Figure 10:
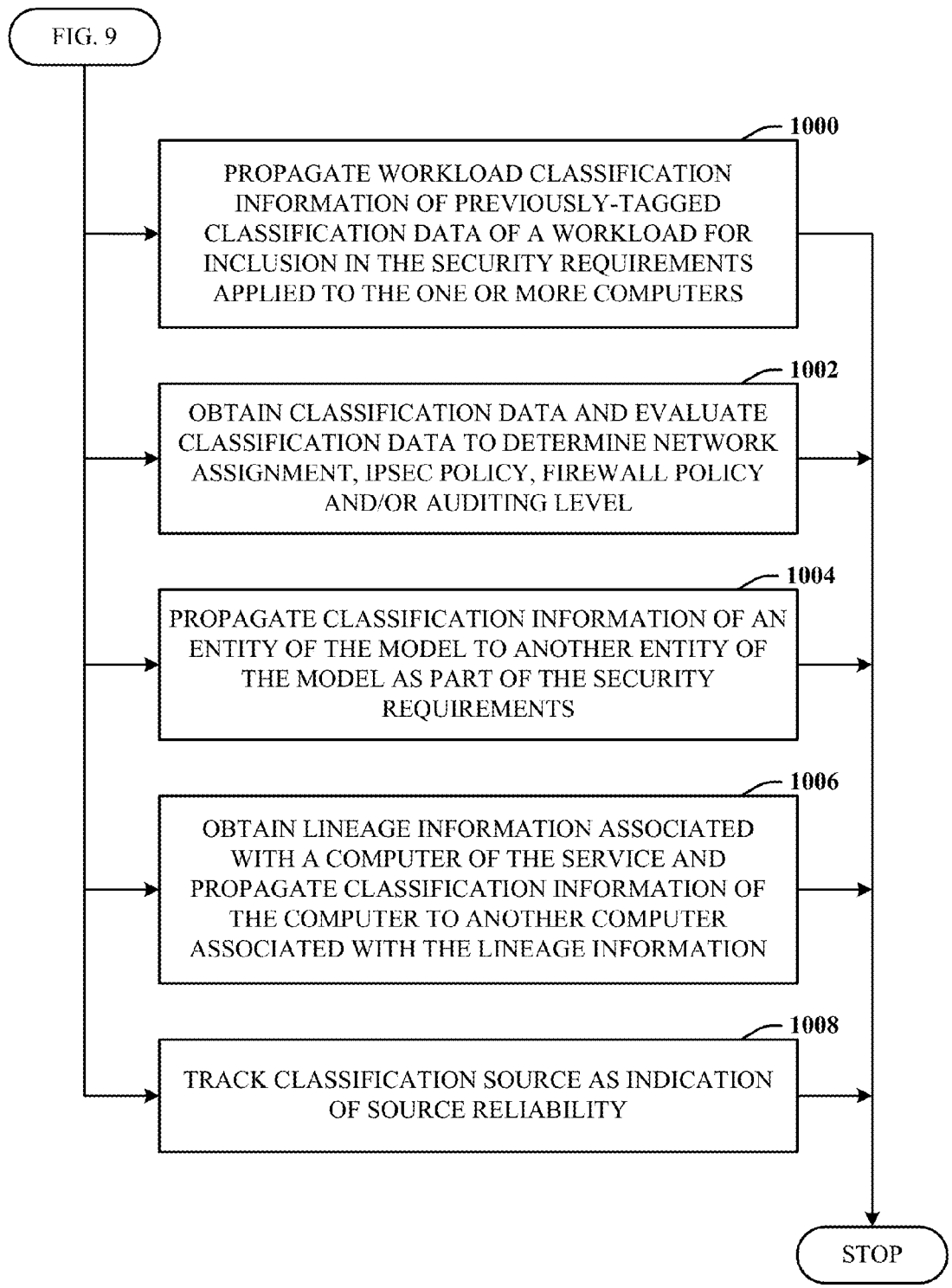
FIG. 10 illustrates additional aspects of the method of FIG. 9.

FIG. 10 illustrates additional aspects of the method of FIG. 9. At 1000, workload classification information of previously-tagged classification data of a workload is propagated for inclusion in the security requirements applied to the one or more computers. At 1002, obtain classification data and evaluate the classification data to determine at least one of network assignment, IPSec policy, firewall policy, or auditing level. At 1004, classification information of an entity of the model is propagated to another entity of the model as part of the security requirements. At 1006, lineage information associated with a computer of the service is obtained and classification information of the computer is propagated to another computer associated with the lineage information. At 1008, a classification source is tracked as an indication of source reliability.

Figure 11:
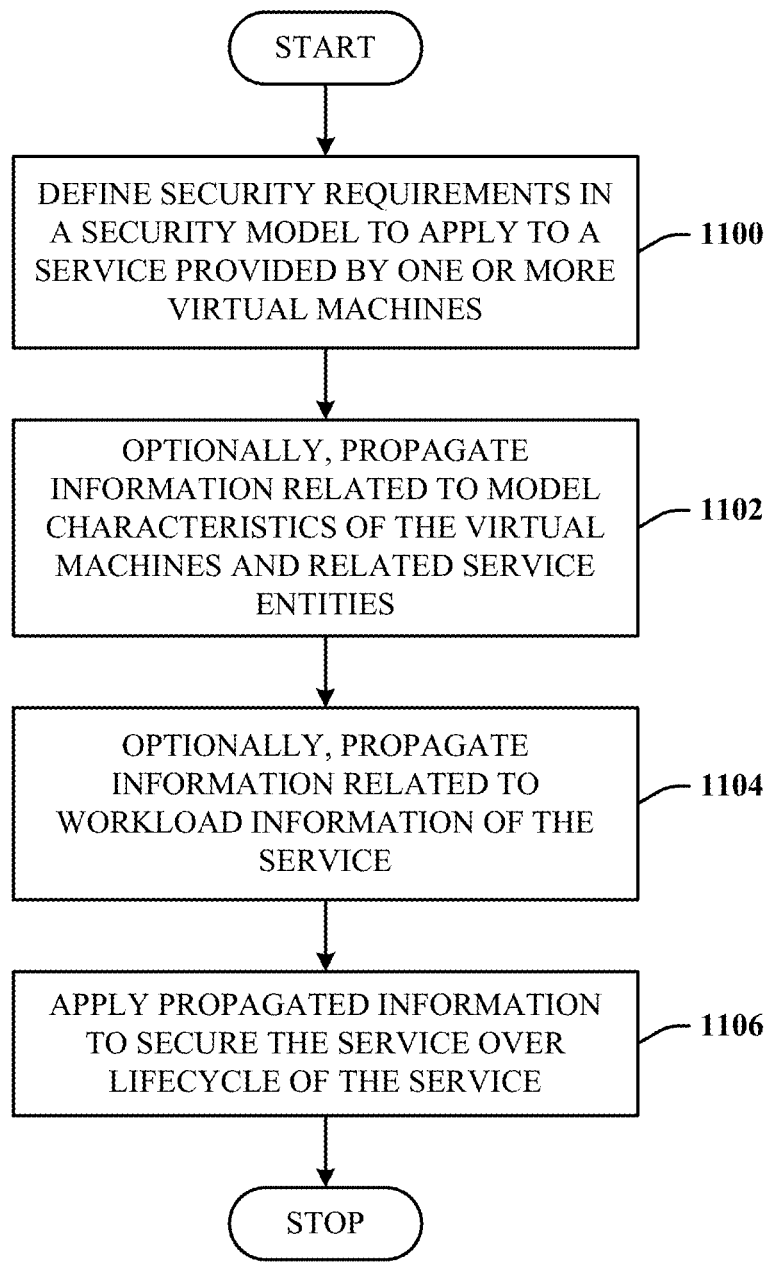
FIG. 11 illustrates a computer-implemented system management method.

FIG. 11 illustrates a computer-implemented system management method. At 1100, security requirements in a security model are defined to apply to a service provided by one or more virtual machines. At 1102, optionally, information related to model characteristics of the virtual machines and related service entities is propagated. At 1104, optionally, information related to workload information of the service is propagated. At 1106, the propagated information is applied to secure the service over lifecycle of the service.

Figure 12:
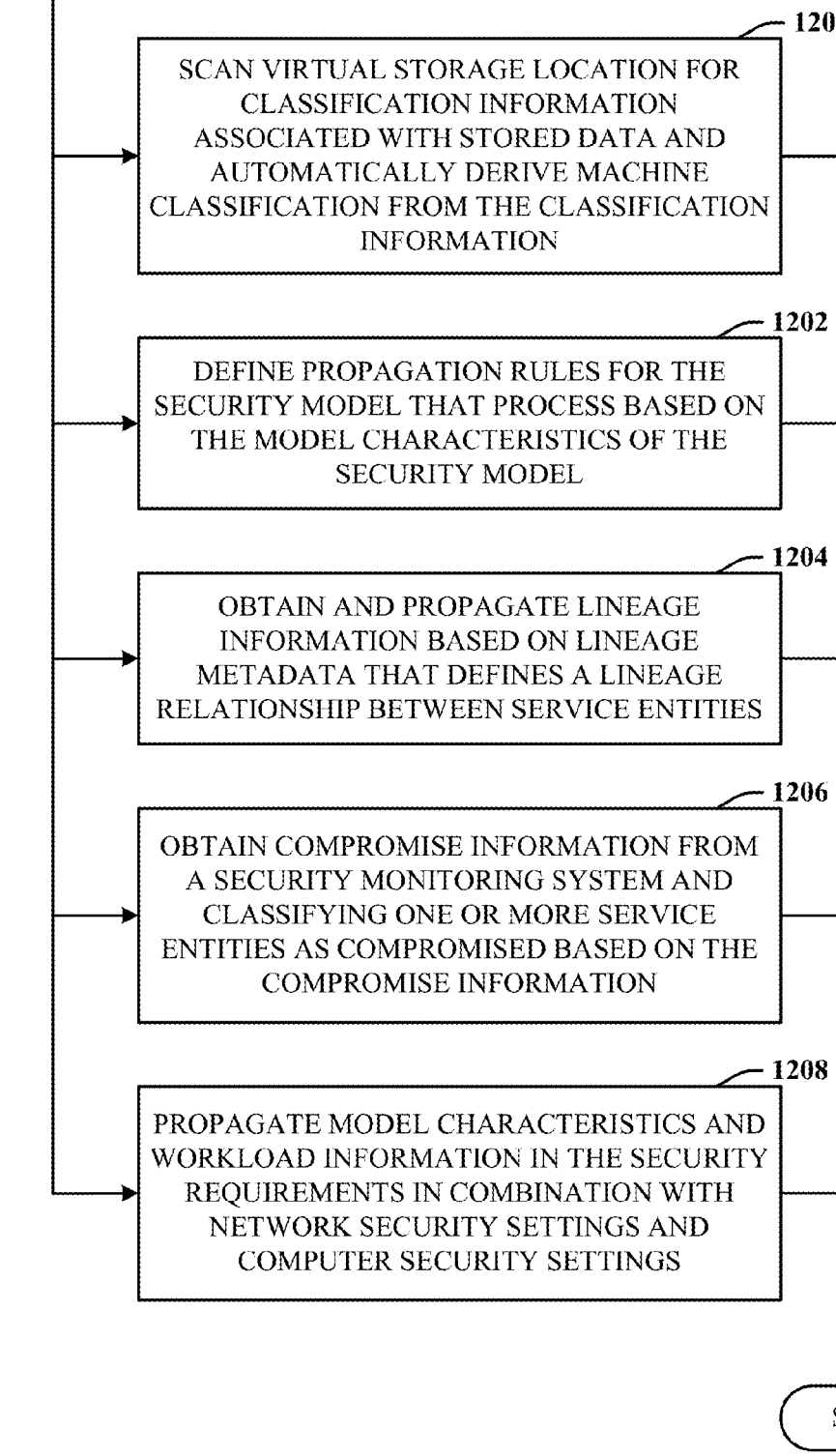
FIG. 12 illustrates additional aspects of the method of FIG. 11.

FIG. 12 illustrates additional aspects of the method of FIG. 11. At 1200, a virtual storage location is scanned for classification information associated with stored data and machine classification is automatically derived from the classification information. At 1202, propagation rules are defined for the security model that process based on the model characteristics of the security model. At 1204, lineage information based on lineage metadata is obtained and propagated that defines a lineage relationship between service entities. At 1206, compromise information is obtained from a security monitoring system and one or more service entities are classified as compromised based on the compromise information. At 1208, the model characteristics and workload information are propagated in the security requirements in combination with network security settings and computer security settings.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
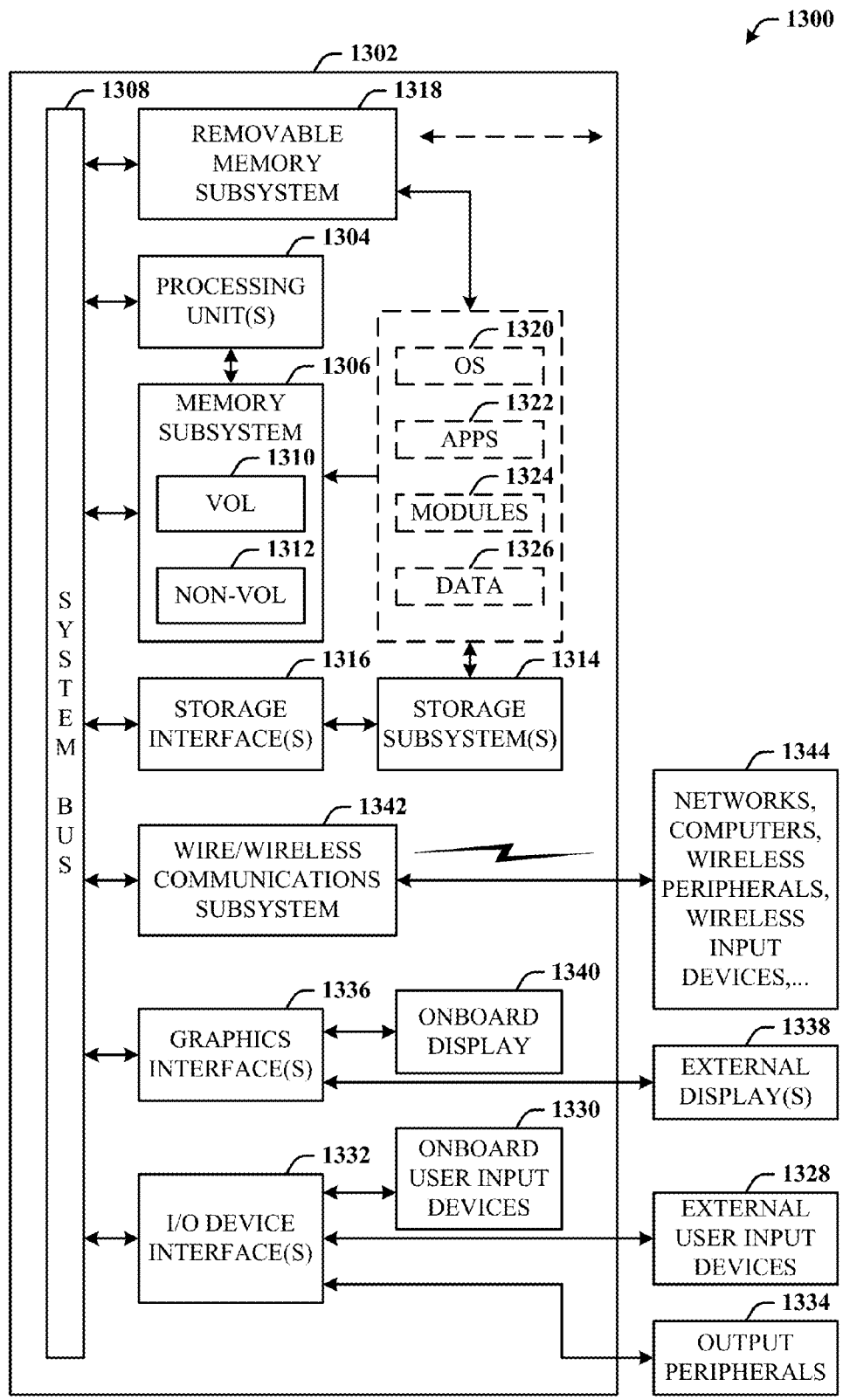
FIG. 13 illustrates a block diagram of a computing system operable to provide systems management in accordance with the disclosed architecture.

Referring now to FIG. 13, there is illustrated a block diagram of a computing system 1300 operable to provide systems management in accordance with the disclosed architecture. In order to provide additional context for various aspects thereof, FIG. 13 and the following description are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a computer-readable storage such as a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include computer-readable storage such as a volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the system memory 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes machine readable storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the entities and components of the system 300 of FIG. 3, the entities and components of the system 700 of FIG. 7, the entities and components of the system 800 of FIG. 8, and the methods represented by the flow charts of FIGS. 4-6 and 9-12, for example.

Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile internal and/or external media that is removable or non-removable. For the computer 1302, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP-based) using logical connections via a wired/wireless communications subsystem 1342 to one or more networks and/or other computers. The other computers can include workstations, servers, routers, personal computers, microprocessor-based entertainment appliances, peer devices or other common network nodes, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented systems management system having a physical storage media, comprising:
    a management component that accesses one or more security policies selected from a respective plurality of security models and applies the security policies to appropriate functions of a service and associated virtual machines with appropriate functions over a service lifecycle, wherein the plurality of security model are created with the one or more security policies that define security requirements for one or more computers that comprise the service;
    a propagation component that obtains and forwards security classifications associated with model characteristics and workload to the management component for inclusion in the security requirements that provide, at least, resource mappings for the service according to a security classification of the workload, for utilization in applying the one or more security policies for security of the one or more computers during the service lifecycle, which includes initial deployment, expansion, moving of servers, monitoring, and reporting; and
    a microprocessor that executes computer-executable instructions associated with at least one of the management component or the propagation component.

2. The system of claim 1, wherein the propagation component obtains workload classification information of previously-tagged classification data of a workload for inclusion in the security requirements applied to the one or more computers.

3. The system of claim 2, further comprising a scanning tool that scans a storage location of the workload for the previously-tagged classification data.

4. The system of claim 3, wherein the storage location is a virtual hard disk of a computer that is a virtual machine.

5. The system of claim 1, wherein the propagation component obtains classification information of an entity of a model and propagates the classification information to another entity of the model as part of the security requirements.

6. The system of claim 1, wherein the propagation component obtains lineage information associated with a computer of the service and propagates classification information to another computer associated with the lineage information, as part of the security requirements.

7. The system of claim 1, wherein the propagation component obtains status information of a service entity and propagates the status information to another entity of the service, as part of applying the security requirements.

8. The system of claim 7, wherein the status information includes compromise information that defines if the one or more computers have been compromised, the compromise information propagated in the security requirements to other computers of the service.

9. A computer-implemented system management method performed by a computer system executing machine-readable instructions, the method, comprising acts of:
    accessing one or more security policies selected from a respective plurality of security models, wherein the plurality of security model are created with the one or more security policies;
    defining security requirements from the security policies selected from the plurality of security models to apply to appropriate functions of a service and associated virtual machines provided by one or more computers over a service lifecycle;
    obtaining and propagating security classifications associated with model characteristics and workload information of the service for inclusion in the security requirements that provide, at least, resource mappings for the service according to a security classification of the workload;
    applying the one or more security policies for security of the one or more computers during the service lifecycle, which includes initial deployment, expansion, moving of servers, monitoring, and reporting; and
    configuring a hardware processor to perform the acts of accessing, defining, obtaining, and applying.

10. The method of claim 9, further comprising propagating workload classification information of previously-tagged classification data of a workload for inclusion in the security requirements applied to the one or more computers.

11. The method of claim 9, further comprising obtaining classification data and evaluating the classification data to determine at least one of network assignment, IPSec policy, firewall policy, or auditing level.

12. The method of claim 9, further comprising propagating classification information of an entity of the model to another entity of the model as part of the security requirements.

13. The method of claim 9, further comprising obtaining lineage information associated with a computer of the service and propagating classification information of the computer to another computer associated with the lineage information.

14. The method of claim 9, further comprising tracking a classification source as an indication of source reliability.

15. A computer-implemented system management method, performed by a computer system executing machine-readable instructions, the method comprising acts of:
- accessing one or more security policies selected from a respective plurality of security models, wherein the plurality of security model are created with the one or more security policies;
- defining security requirements the security policies selected from the plurality of security models to apply to appropriate functions of a service provided by one or more virtual machines over a service lifecycle;
- propagating security classifications associated with model characteristics and workload to the management component for inclusion in the security requirements that provide, at least, resource mappings for the service according to a security classification of the workload;
- applying the propagated information for inclusion in the security requirements to secure the service over a lifecycle of the service, which includes initial deployment, expansion, moving servers, monitoring, and reporting; and
- configuring a hardware processor to perform at least one of the acts of accessing, defining, propagating, or applying.

16. The method of claim 15, further comprising scanning a virtual storage location for classification information associated with stored data and automatically deriving machine classification from the classification information.

17. The method of claim 15, further comprising defining propagation rules for the security model that process based on the model characteristics of the security model.

18. The method of claim 15, further comprising obtaining and propagating lineage information based on lineage metadata that defines a lineage relationship between service entities.

19. The method of claim 15, further comprising obtaining compromise information from a security monitoring system and classifying one or more service entities as compromised based on the compromise information.

20. The method of claim 15, further comprising propagating the model characteristics and workload information in the security requirements in combination with network security settings and computer security settings.

* * * * *